US012771806B2

(12) United States Patent
Jeong et al.

(10) Patent No.: US 12,771,806 B2
(45) Date of Patent: Oct. 20, 2026

(54) CONTROLLING METHOD OF A VIDEO RECORD SYSTEM AND THE VIDEO RECORD SYSTEM

(71) Applicants: Hyundai Motor Company, Seoul (KR); Kia Corporation, Seoul (KR)

(72) Inventors: Dong Hyuk Jeong, Hwaseong (KR); Jeong Muk Kang, Hwaseong (KR); Ki Chul Kim, Hwaseong (KR); Seok Ju Yeom, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/812,080

(22) Filed: Aug. 22, 2024

(65) Prior Publication Data

US 2025/0097378 A1 Mar. 20, 2025

(30) Foreign Application Priority Data

Sep. 15, 2023 (KR) ........................ 10-2023-0123187

(51) Int. Cl.

| | |
|---|---|
| ***H04N 5/76*** | (2006.01) |
| ***B60R 11/04*** | (2006.01) |
| ***G07C 5/00*** | (2006.01) |
| ***G07C 5/08*** | (2006.01) |
| ***H04L 9/40*** | (2022.01) |
| ***H04L 12/12*** | (2006.01) |
| ***H04N 5/77*** | (2006.01) |
| ***H04N 7/18*** | (2006.01) |
| ***H04N 23/57*** | (2023.01) |
| ***H04W 48/20*** | (2009.01) |

(Continued)

(52) U.S. Cl.
CPC ............... *H04N 5/76* (2013.01); *H04N 7/183* (2013.01); *H04L 67/12* (2013.01)

(58) Field of Classification Search
None
See application file for complete search history.

(56) References Cited

U.S. PATENT DOCUMENTS

2013/0198369 A1* 8/2013 Kim .................... H04L 61/5084 709/224
2016/0006922 A1* 1/2016 Boudreau ............ H04N 23/661 348/207.1

(Continued)

OTHER PUBLICATIONS

Murphy, Portable Router Vs Wireless Router? Which Is Better at https://techsynchron.com/portable-router-vs-wireless-router/, Jun. 9, 2023. (Year: 2023).*

*Primary Examiner* — Hung Q Dang
(74) *Attorney, Agent, or Firm* — Fox Rothschild LLP

(57) ABSTRACT

Described is a method of controlling a system for recording videos, which comprises comprising a camera module configured to capture a video of an area surrounding the vehicle, a first memory configured to store the video transmitted from the camera module, and a first controller which comprises a second memory configured to store a computer program for controlling an operation of storing the video and a processor configured to execute the computer program, may include, through execution of the computer program by the processor, accessing, a router that supports a wireless communication through a communication module, and transmitting the video to a device external to the vehicle through the wireless Internet communication.

14 Claims, 7 Drawing Sheets

(51) Int. Cl.

| | |
|---|---|
| ***H04W 84/12*** | (2009.01) |
| *H04L 67/12* | (2022.01) |

(56) References Cited

U.S. PATENT DOCUMENTS

| | | | | |
|---|---|---|---|---|
| 2017/0028935 | A1* | 2/2017 | Dutta | H04N 21/4223 |
| 2017/0034776 | A1* | 2/2017 | Hou | H04W 48/20 |
| 2020/0245144 | A1* | 7/2020 | Sandu | H04W 12/50 |
| 2020/0357269 | A1* | 11/2020 | Elhadeedy | H04W 4/021 |
| 2023/0101682 | A1* | 3/2023 | Qian | H04W 48/20 455/434 |
| 2024/0133571 | A1* | 4/2024 | Hirano | G08C 17/02 |

* cited by examiner

CONTROLLING METHOD OF A VIDEO RECORD SYSTEM AND THE VIDEO RECORD SYSTEM

CROSS-REFERENCE TO RELATED APPLICATIONS

The present application claims under 35 U.S.C. § 119(a) the benefit of Korean Patent Application No. 10-2023-0123187, filed on Sep. 15, 2023, the entire contents of which is incorporated herein for all purposes by this reference.

BACKGROUND

Technical Field

The present disclosure relates to a method of controlling a system for recording videos and the system for recording videos.

Background

The statements in this section merely provide background information related to the present disclosure and may not constitute prior art.

One example of a system for recording videos is a system for recording videos of the surroundings of a vehicle when the vehicle is driving or parked.

Since the system for a vehicle is mainly used to obtain videos of accidents that occur while the vehicle is driving, it can generally be called a system for recording driving videos.

To obtain videos, the system basically comprises a controller, a memory for storing videos, and a camera for capturing videos.

The system generally stores videos of the surroundings of the vehicle along with driving data at the time, and records videos according to preset settings upon sensing a set event even when the vehicle is parked.

The system was initially called as "a black box" in Korea and was mounted to vehicles as an external type after purchased from the aftermarket, but, recently, a built-in type which is installed into vehicles before the shipping is available too.

Compared to the external type, the built-in type allows access to driving data of the vehicle and linkage with other controllers, and are expected to be increasingly used.

In general, videos obtained by the system can be viewed through a display screen in the vehicle, by connecting the system to a smartphone with a USB cable, or by connecting the memory card where the videos are stored to a smartphone.

However, there are limitations in remotely viewing videos obtained by conventional systems for recording driving videos, and there is a need to find ways to overcome these limitations.

The information included in this Background of the present disclosure section is only for enhancement of understanding of the general background of the present disclosure and may not be taken as an acknowledgement or any form of suggestion that this information forms the prior art already known to a person skilled in the art.

SUMMARY

When videos obtained by the system for recording driving videos are transmitted to an outside device through a wireless mobile communication modem of the vehicle, there are limitations due to communication time and costs caused by the large volume of data.

Videos can be compressed to solve such problems, but, in that case, it may be difficult to accurately analyze the circumstances of an accident due to reduced image quality.

In addition, when related devices such as a vehicle modem and a communication network in the vehicle are activated for a long time even while the vehicle is parked in order to allow a user to remotely view videos at a desired time, the battery can be overused.

At least one exemplary embodiment of the present disclosure aims to alleviate or resolve such problems.

At least one exemplary embodiment of the present disclosure aims to enable a user to remotely view videos obtained by the system for recording driving videos in the vehicle while reducing communication costs and power consumption.

As an exemplary embodiment of the present disclosure, a method of controlling a system for recording videos, which comprises comprising a camera module configured to obtain a video around the vehicle, a first memory configured to store the video transmitted from the camera module, and a first controller which comprises a second memory configured to store a computer program for controlling an operation of storing the video and a processor configured to execute the computer program, may include through execution of the computer program by the processor, accessing a router that supports a wireless Internet communication through a communication module, and transmitting, by the controller, the video to a device external to the vehicle through the wireless Internet communication. According to at least one exemplary embodiment of the present disclosure, the communication module is a communication module in the system for recording videos or a communication module of another device in the vehicle.

According to at least one exemplary embodiment of the present disclosure, the accessing the router includes turning on the communication module based on a signal transmitted through a communication unit that supports a wireless mobile communication within the vehicle, and transmitting information related to at least one wireless Internet router around the vehicle to an external server and accessing one router selected through the external server among the information related to the at least one wireless Internet router.

According to at least one exemplary embodiment of the present disclosure, the accessing the one router selected through the external server includes transmitting the information about the at least one wireless Internet router to a user terminal through the external server, and accessing the one router selected through the external server from the user terminal.

According to at least one exemplary embodiment of the present disclosure, the accessing the one router selected through the external server further includes receiving a password for accessing the one router from the user terminal through the external server.

According to at least one exemplary embodiment of the present disclosure, the transmitting the video to the device external to the vehicle includes receiving at least one command from a user terminal through the wireless Internet communication, and transmitting the video to the device external to the vehicle through the wireless Internet communication according to the at least one command.

According to at least one exemplary embodiment of the present disclosure, the at least one command includes transmitting the video to the user terminal through an external server or transmitting the video to an external storage server designated from the user terminal.

According to at least one exemplary embodiment of the present disclosure, the accessing the router includes searching for one or more wireless Internet routers around the vehicle as the vehicle is parked and accessing a pre-designated router among the one or more wireless Internet routers.

According to at least one exemplary embodiment of the present disclosure, the accessing the router includes transmitting a notice of having accessed the pre-designated router to a user terminal through an external server.

According to at least one exemplary embodiment of the present disclosure, the transmitting the video to the device external to the vehicle includes transmitting the video according to a command transmitted from a user terminal through an external server or automatically transmitting the video according to preset settings.

Meanwhile, a system for recording videos according to an exemplary embodiment of the present disclosure may comprise a camera module configured to capture a video of an area surrounding a vehicle, a first memory configured to store the video transmitted from the camera module, and a first controller comprising a second memory configured to store a computer program for controlling an operation of storing the video and a processor configured to execute the computer program, wherein, through execution of the computer program by the processor, the controller is configured to perform accessing a router that supports a wireless Internet communication through a communication module and transmitting the video to a device external to the vehicle through the wireless communication.

In a system according to at least one exemplary embodiment of the present disclosure, the communication module is a communication module in the system for recording videos or a communication module of another device in the vehicle.

In a system according to at least one exemplary embodiment of the present disclosure, the accessing the router includes turning on the communication module based on a signal transmitted through a communication unit supporting a wireless mobile communication within the vehicle, and transmitting information related to at least one wireless Internet router around the vehicle to an external server and accessing one router selected through the external server among the information related to the at least one wireless Internet router.

In a system according to at least one exemplary embodiment of the present disclosure, the accessing the one router selected through the external server includes transmitting the information related to the at least one wireless Internet router to a user terminal through the external server, and accessing the one router selected through the external server from the user terminal.

In a system according to at least one exemplary embodiment of the present disclosure, the accessing the one router selected through the external server further includes receiving a password for accessing the one router from the user terminal through the external server.

In a system according to at least one exemplary embodiment of the present disclosure, the transmitting the video to the device external to the vehicle includes receiving at least one command from a user terminal through the wireless Internet communication, and transmitting the video to the device external to the vehicle through the wireless Internet communication according to the at least one command.

In a system according to at least one exemplary embodiment of the present disclosure, the at least one command includes transmitting the video to the user terminal through the external server or transmitting the video to an external storage server designated by the user terminal.

In a system according to at least one exemplary embodiment of the present disclosure, the accessing the router includes searching for one or more wireless Internet routers around the vehicle as the vehicle is parked and accessing a pre-designated router among the one or more wireless Internet routers.

In a system according to at least one exemplary embodiment of the present disclosure, the accessing the router includes transmitting a notice of having accessed the pre-designated router to a user terminal through an external server.

In a system according to at least one exemplary embodiment of the present disclosure, the transmitting the video to the device external to the vehicle includes transmitting the video according to a command transmitted from a user terminal through an external server or automatically transmitting the video according to preset settings.

According to at least one exemplary embodiment of the present disclosure, it may be possible to enable a user to remotely view videos obtained by the system for recording driving videos in a vehicle in relatively high quality while reducing communication costs and power consumption.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
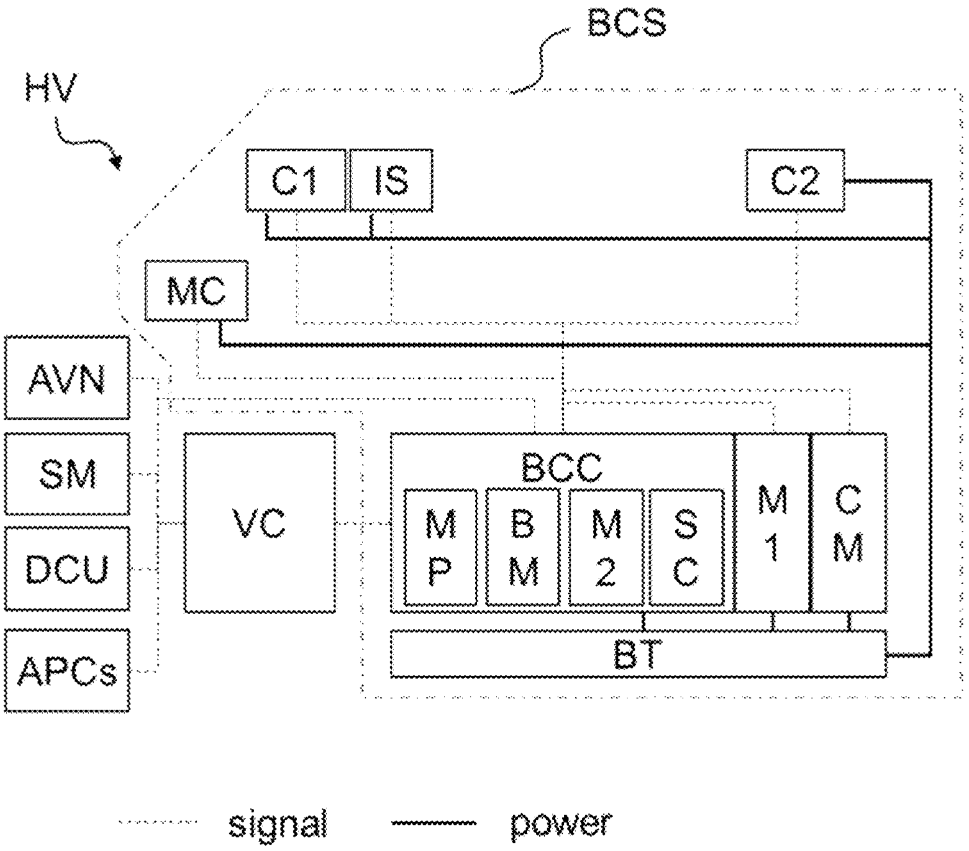
FIG. 1 conceptually shows a system for recording driving videos and components of the vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes, will be determined in part by the particularly intended application and use environment.

In the figures, the same reference numerals refer to the same or equivalent parts of the present disclosure throughout the several figures of the drawing.

DETAILED DESCRIPTION

Because various changes can be made to the present disclosure and a range of embodiments can be made for the present disclosure, specific embodiments will be illustrated and described in the drawings. However, this is not intended to limit the present disclosure to the specific embodiments, and it should be understood that the present disclosure includes all changes, equivalents, and substitutes within the technology and the scope of the present disclosure.

The terms "module" and "unit" used in the present disclosure are merely used to distinguish the names of components, and should not be interpreted as assuming that the components have been physically or chemically separated or can be so separated.

Terms containing ordinal numbers such as "first" and "second" may be used to describe various components, but the components are not limited by the terms. The above-mentioned terms can be used only as names to distinguish one component from another component, and the order therebetween can be determined by the context in the descriptions thereof, not by such names.

The expression "and/or" is used to include all possible combinations of multiple items being addressed. For example, by "A and/or B," all three possible combinations are meant: "A," "B," and "A and B."

When a component is said to be "coupled" or "connected" to another component, it means that the component may be directly coupled or connected to the other component or there may be other components therebetween.

The terms used herein are only used to describe specific embodiments and are not intended to limit the present disclosure. Expressions in the singular form include the meaning of the plural form unless they clearly mean otherwise in the context. In the present disclosure, expressions such as "comprise" or "have" are intended to indicate the presence of features, numbers, steps, operations, components, parts, or combinations thereof described herein, and should not be understood as precluding the possibility of the presence or the addition of one or more other features, numbers, steps, operations, components, parts, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Unless otherwise defined, all terms used herein, including technical or scientific terms, have meanings commonly understood by a person having ordinary skill in the technical field to which the present disclosure pertains. Terms defined in commonly used dictionaries should be interpreted as having meanings consistent with the meanings they have in the context of the relevant technology, and should not be interpreted in an ideal or overly formal sense unless explicitly defined in the present disclosure.

In addition, a unit, a control unit, a control device, or a controller is only a term widely used to name devices for controlling a certain function, and do not mean a generic function unit. For example, devices with these names may include a communication device that communicates with other controllers or sensors to control a certain function, a computer-readable recording medium that stores an operating system, logic instructions, input/output information, etc., and one or more processors that perform operations of determination, calculation, making decisions, etc. required to control the function.

Meanwhile, the processor may include a semiconductor integrated circuit and/or electronic devices that carry out operations of at least one of comparison, determination, calculation, and making decisions to perform a programmed function. For example, the processor may be any one or a combination of a computer, a microprocessor, a CPU, an ASIC, and an electronic circuit such as circuitry and logic circuits.

The processor may be electrically connected to a memory and may load and write data from the memory. The memory and the processor may be integrated or may be physically separate.

Hereinafter, the embodiments of the present disclosure will be described in detail with reference to the attached drawings.

Referring to FIG. 1, a built-in system for recording driving videos according to an exemplary embodiment of the present disclosure, termed a built-in cam system BCS, may be installed inside a host vehicle HV. This system may include several components: a camera module, a first memory M1, a communication module CM, a microphone MC, an impact sensor IS, a power auxiliary battery BT, and a built-in cam controller BCC.

The system for recording driving videos according to this embodiment may be a built-in system, but is not necessarily limited thereto.

According to this embodiment, the camera module may include a front camera C1 and a rear camera C2; however, it is not limited to these configurations. The front camera C1 may be installed to capture videos of the front area of the vehicle HV, and the rear camera C2 may be installed to capture videos of the rear area of the vehicle HV.

For example, the front camera C1 may be installed near the rear-view mirror on the window shield of the vehicle HV, and the rear camera C2 may be installed on the rear window or the rear bumper of the vehicle HV.

The front camera C1 and the rear camera C2 may provide image quality of any one of HD, FHD, and Quad HD levels, for example.

The front camera C1 and the rear camera C2 may not necessarily have the same level of image quality. It is also worth noting that a camera from the advanced driving assistance system (ADAS) of the host vehicle HV may be used.

In addition, the camera may have an aperture value of F2.0 or F1.6 or lower. As an aperture value decreases, more light may gather, making it possible to obtain bright recording. Furthermore, image tuning technology may be applied to minimize noise and light loss, enabling clear recording even in dark environments.

Examples of the first memory M1 may include all types of storage devices for storing data that can be read by a computer system. For example, they may include at least one of a memory such as a flash memory, a hard disk, a micro (MC) memory, and a card memory, e.g., a secure digital card (SD card) or an eXtream digital card (XD card), and a memory such as a random access memory (RAM), a static ram (SRAM), a read-only memory (ROM), a programmable ROM (PROM), an electrically erasable PROM (EEPROM), a magnetic RAM (MRAM), a magnetic disk, and an optical disk.

According to the embodiment of the present disclosure, the first memory M1 may be a micro SD of 64 Gbyte or more and may be an external memory. For example, continuous recording while driving (hereinafter, simply referred to as "continuous driving recording") may be possible for several hours, and continuous recording while parked (hereinafter, simply referred to as "continuous parking recording") may be possible for up to tens of hours. In addition, event recording that occurs when an impact is sensed may be done up to dozens of times. The event recording may include recording caused by impacts occurring while driving (hereinafter, simply referred to as "driving impact recording") and recording caused by impacts occurring while parked (hereinafter, simply referred to as "parking impact recording"). Here, when a vehicle's ignition switch is in the "ignition on (IGN ON)" state, the vehicle may be determined to be in a driving mode, and, otherwise, it may be determined to be in a parking mode.

Users may easily check the stored contents by taking out a SD card and connecting it to a desktop computer, etc.

Users may check information about the status of a SD card through the connected car service and information about the replacement time of the SD card determined based on the memory status through the same service.

The communication module CM may support a wireless Internet communication including at least one of a wireless LAN (WLAN), Wireless Fidelity (Wi-Fi), Digital Living Network Alliance (DLNA), a wireless broadband (Wi-bro), and World Interoperability for Microwave Access (Wi-max).

The microphone MC may support voice recording. When recording driving videos of the vehicle HV, it may be possible to record sound as well as video.

The impact sensor IS may sense an external impact and may be, for example, a 1-axis or 3-axis acceleration sensor.

The impact sensor IS may be provided exclusively for the built-in cam system BCS, however, it is also possible to utilize an acceleration sensor installed in the host vehicle HV.

The signal from the impact sensor IS may serve as a reference point for starting event recording, which will be described below, and it may be possible for the intensity of the impact serving as the reference point to be set by a user.

For example, it may be possible for a user to select the sensitivity for sensing an impact serving as the reference point for starting event recording when setting up the built-in cam system BCS through the display screen in the vehicle HV, e.g., an AVN screen, which will be described below.

For example, the sensitivity for sensing an impact may be divided into five levels: level 1 (very insensitive), level 2 (insensitive), level 3 (normal), level 4 (sensitive), and level 5 (very sensitive).

The built-in cam system BCS may receive power from a battery, e.g., a 12 V battery, installed in the vehicle HV.

The system may operate by receiving power from the battery of the vehicle (HV) not only while driving but also when parked. However, in this embodiment, an auxiliary power battery (BT) is included to prevent depletion of the vehicle's main battery.

According to the embodiment of the present disclosure, the built-in cam system BCS may receive power from any one of the battery of the vehicle HV and either an alternator of an internal combustion engine vehicle or a lower DC/DC converter (LDC) of an electric vehicle while the vehicle is driving, but may receive power from the power auxiliary battery BT when the vehicle is parked.

The power auxiliary battery BT may be charged or discharged based on the environment where the vehicle HV is operating, and may supply optimal power for recording and an OTA software update when the vehicle is parked.

The power auxiliary battery BT may be charged by the battery of the vehicle HV, e.g., a low-voltage battery or a high-voltage battery of an electric vehicle, or by an alternator of the vehicle HV being an internal combustion engine vehicle.

The Built-in cam controller BCC may function as a higher-level controller that controls other components of the Built-in cam system BCS. It may also exchange signals with the controller VC of the host vehicle HV and/or a data communication unit DCU, a sensor module SM, part controllers APCs, an audio video navigation AVN, etc. For such signal exchanges, the local interconnect network (LIN), the controller area network (CAN), or Ethernet may be used.

Here, the data communication unit DCU may support a wireless mobile communication, and the wireless mobile communication may include at least one of the global system for mobile communication (GSM), the code division multi access (CDMA), the wideband CDMA (WCDMA), the high speed downlink packet access (HSDPA), the long term evolution (LTE), and 5G. In addition, the data communication unit DCU may support a short-range wireless communication including at least one of Bluetooth, Radio Frequency Identification (RFID), Infrared Data Association (IrDA), Ultra-Wideband (UWB), ZigBee, Near Field Communication (NFC), and Wireless-Fidelity (Wi-Fi) Direct.

Furthermore, the sensor module SM may include one or more of a speed sensor, an acceleration sensor, a vehicle position sensor such as a GPS receiver, a steering angle sensor, a yaw rate sensor, a pitch sensor, and a roll sensor, and the part controllers APCs may include one or more of a turn indicator controller, a turn signal controller, a wiper controller, an ADAS system controller, and an airbag controller.

The built-in cam controller BCC may control other components to perform the continuous driving recording, the continuous parking recording, the event recording caused by a signal from the impact sensor.

When such recording is initiated, information about the vehicle's (HV) driving characteristics may also be recorded.

Here, the information about the driving of the vehicle HV may include information about time, vehicle speed, gear position, turn signals, the level of sensing an impact, i.e., one of the five levels described above, global positioning system (GPS) location information, etc.

The driving information may be transmitted from the vehicle controller VC. However, it can also be sourced directly from a corresponding module or component of the vehicle HV. For example, information about vehicle speed may be directly transmitted from the speed sensor of the vehicle HV, information about a turn indicator directly from the turn indicator controller or information about a turn signal directly from the turn signal controller, and GPS location information directly from the AVN or the GPS receiver.

As described above, when an event is sensed while the vehicle is parked, the event recording may be performed based on the sensitivity for sensing impacts that a user has set.

During the event recording, recording may proceed from a set time before the time point when an event has occurred to a set time thereafter, and it may be possible for the set time to be selected by a user.

The AVN may be connected to the built-in cam controller BCC directly or through the vehicle controller VC, and the AVN screen may serve as a user interface for a user to select various setting parameters of the built-in cam system BCS.

The built-in cam controller BCC may transmit recorded videos to an external server at set intervals, at intervals set by a user, or when an event set by the user occurs, that is, according to the level of sensing impacts that has been set by the user.

The built-in cam controller BCC may include a second memory M2 and a processor MP to perform its function.

For example, to execute programmed functions, the processor MP may include a semiconductor integrated circuit and/or electronic devices that carry out operations of at least one of comparison, determination, calculation, and making decisions. For example, the processor MP may be any one or a combination of a computer, a microprocessor, a CPU, an ASIC, and an electronic circuit such as circuitry and logic circuits.

Examples of the second memory M2 may include all types of storage devices for storing data that can be read by a computer system. For example, they may include at least one of a memory such as a flash memory, a hard disk, a micro (MC) memory, and a card memory, e.g., a secure digital card (SD card) or an eXtream digital card (XD card), and a memory such as a random access memory (RAM), a static ram (SRAM), a read-only memory (ROM), a programmable ROM (PROM), an electrically erasable PROM (EEPROM), a magnetic RAM (MRAM), a magnetic disk, and an optical disk.

The operating software of the built-in cam controller BCC may be stored in the second memory M2, and the processor MP may perform the function of the built-in cam controller BCC by reading and executing the software.

Meanwhile, the built-in cam controller BCC may include a buffer memory BM for the operations of determination, calculation, etc. of the processor MP.

In addition, the built-in cam controller BCC may include a super capacitor SC. When power is applied to the built-in cam controller BCC, the super capacitor SC may be charged.

When power is suddenly cut off due to shock, damage, etc., the power of the super capacitor SC may be used to complete the operation of saving a video in progress.

For example, the super capacitor SC may have a charging capacity for maintaining the power of the built-in cam controller BCC for several to tens of seconds.

Figure 2:
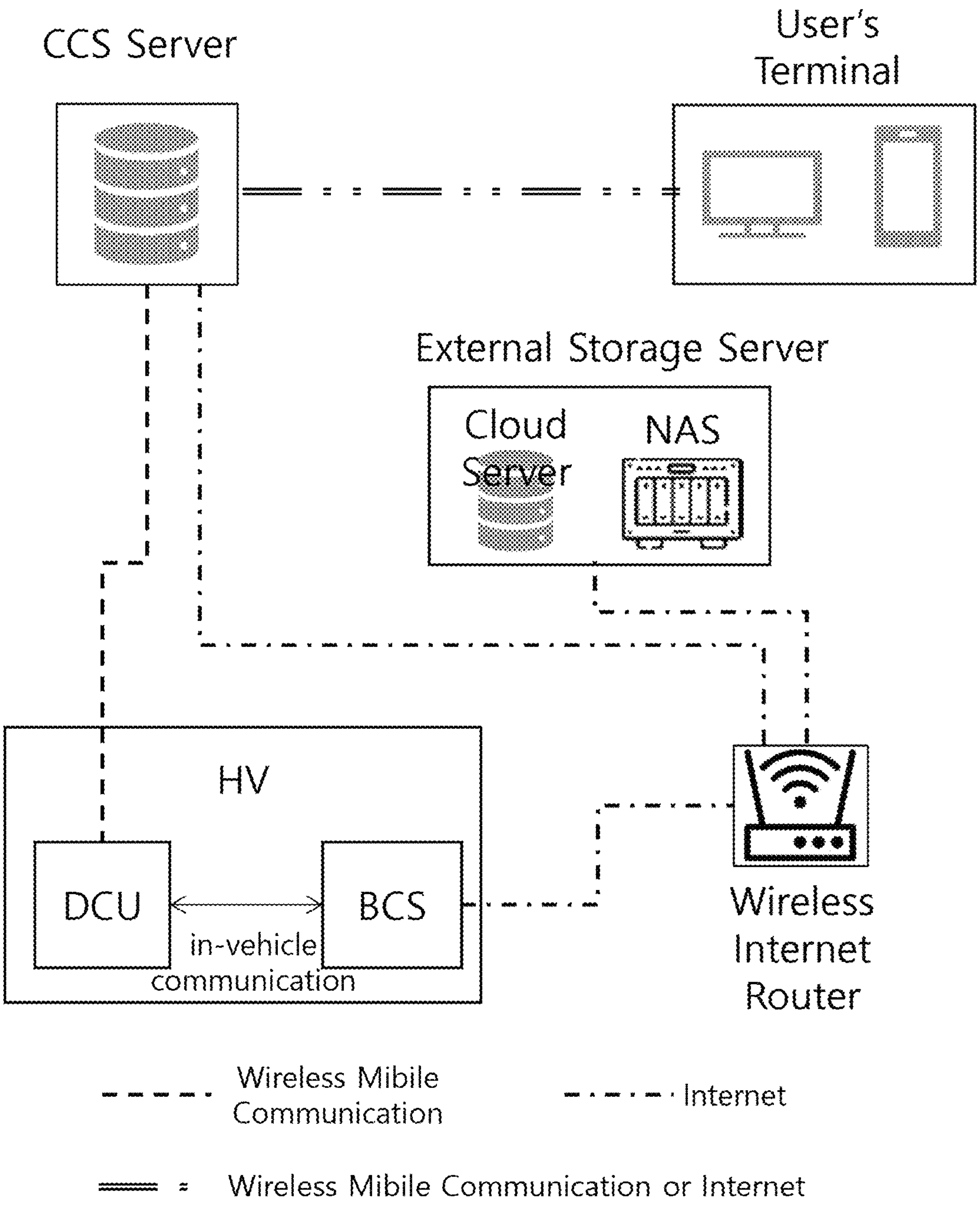
FIG. 2 shows how the devices communicate with each other according to an exemplary embodiment of the present disclosure.

FIG. 2 illustrates how the vehicle HV communicates with external devices according to the embodiment in FIG. 1.

Referring to FIG. 2, the vehicle HV according to this embodiment may be connected to a connected car service (CCS) server, which is an external server, by a wireless mobile communication through the data communication unit DCU. In addition, the built-in cam system BCS may be connected to a wireless Internet router around the vehicle HV through the communication module CM, thereby communicating with the CCS server and external storage servers through a wireless Internet communication. Here, the external storage servers may include a cloud server and/or the network-attached storage (NAS).

In this embodiment, the communication module (CM) may be a Wi-Fi module, although other types are also possible. In addition, the wireless Internet router may be an open or private Wi-Fi router around the vehicle HV. Here, it may be possible to access the open router without a password, but it is needless to say that a password is required to access the private router.

Meanwhile, as shown in FIG. 2, a user terminal may be connected to the CCS server through a wireless mobile communication or a wireless Internet communication. Examples of the user terminal may include desktops, laptops, tablet PCs, smartphones, smartwatches, etc. A user may access a website for the CCS or a service for videos by built-in cameras (e.g., a website provided by the CCS server) through the user terminal, or may use the service through a software application installed in the user terminal.

Figure 3:
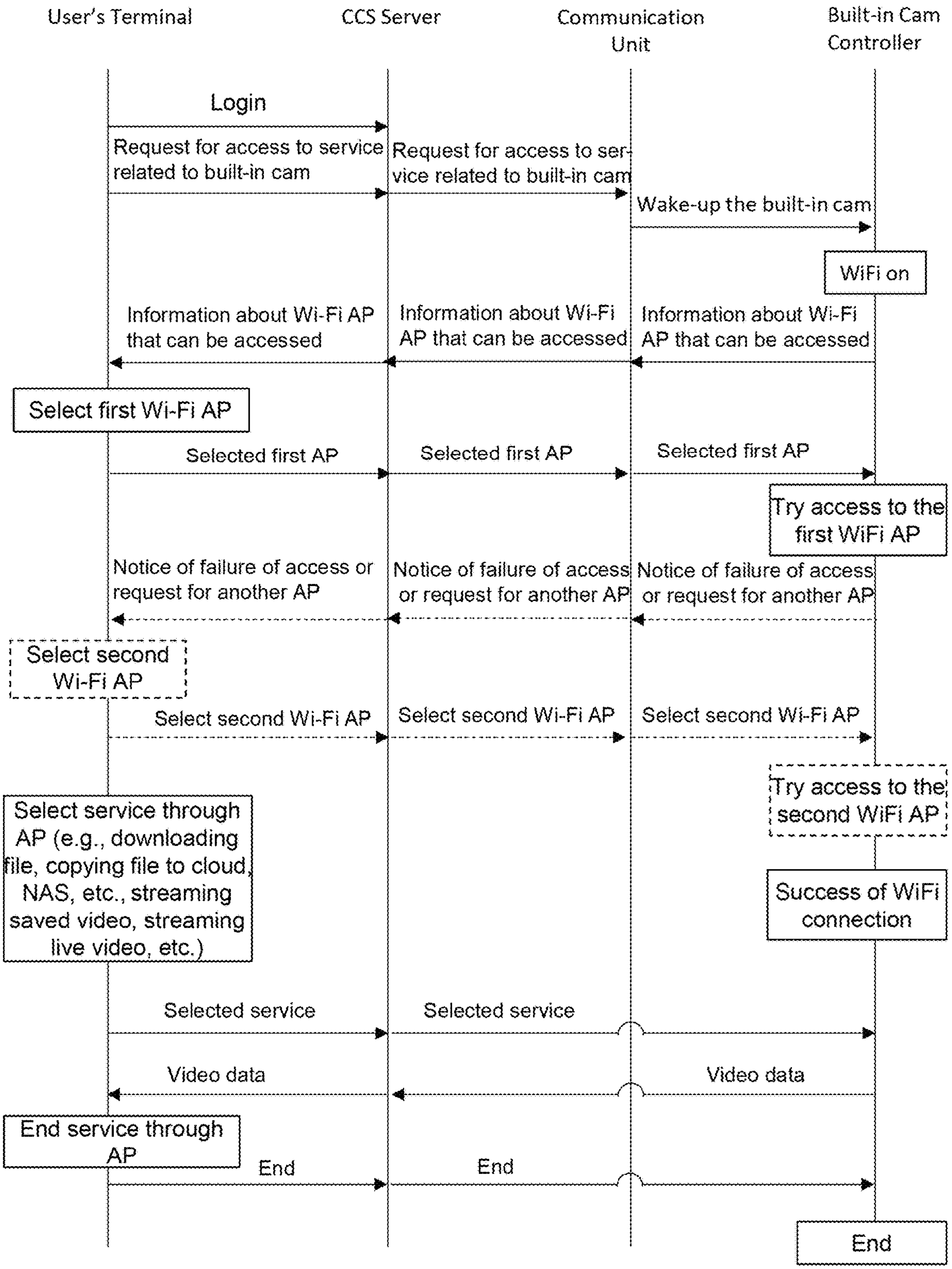
FIG. 3 shows the control process according to the embodiment in FIG. 2.

FIG. 3 shows the control process according to the embodiment in FIG. 2, which will be described in detail below.

First, in this embodiment, it is assumed that the vehicle HV is parked with the engine turned off, but it is not necessarily limited thereto.

A user may log into the CCS server and request access to the built-in cam service through the user terminal.

The CCS server may transmit the request for the access to the data communication unit DCU of the vehicle HV, and the data communication unit DCU may accordingly transmit a wake-up signal to the built-in cam controller BCC.

The built-in cam controller BCC may turn on the Wi-Fi mode of the communication module CM as it receives the wake-up signal.

In addition, the built-in cam controller BCC may collect information about at least one wireless Internet router (hereinafter, referred to as a "Wi-Fi router") that can be accessed nearby, and may transmit this information to the data communication unit DCU through an in-vehicle communication.

This information may include the router's ID or name, communication strength, and its status as open or private-indicating whether a password is required.

The data communication unit DCU may transmit information about at least one Wi-Fi router to the CCS server through a wireless mobile communication, and the CCS server may transmit it to the user terminal.

A user may select one of pieces of the information about at least one Wi-Fi router (referred to as "the first Wi-Fi router" for convenience) transmitted to the user terminal.

In addition, the information about the first Wi-Fi router selected in this way may be transmitted to the CCS server, the CCS server may transmit it to the data communication unit DCU, and the data communication unit DCU may transmit the transmitted information to the built-in cam controller BCC.

Here, the information about the first Wi-Fi router may include information about a password to access the router.

The built-in cam controller BCC may attempt to access the first Wi-Fi router based on the information about the router.

Here, when the attempt to access the router fails, the built-in cam controller BCC may transmit a report on the failure or a request for selection of another router to the data communication unit DCU, and the data communication unit DCU may transmit it to the user terminal through the CCS server.

In the case of failure of access to the first Wi-Fi router, another Wi-Fi router (hereinafter, referred to as "the second Wi-Fi router" for convenience) may be selected by a user through the user terminal, and information about the selection may also be transmitted to the built-in cam controller BCC through the CCS server and the data communication unit DCU.

Once the built-in cam controller (BCC) successfully connects to either the first or second Wi-Fi router and establishes a Wi-Fi connection, it may directly communicate with the CCS server via Wi-Fi, bypassing the data communication unit (DCU).

In this case, the data communication unit DCU, devices required for data transmission through it, etc. may no longer need to be activated, so they may all be turned off to reduce power consumption.

While the built-in cam controller BCC is connected to the CCS server through Wi-Fi, it may be possible for a user to use a desired service remotely through the user terminal. In this case, the vehicle HV may use a wireless Internet communication rather than a wireless mobile communication for the service.

For example, a user may download a real-time or stored video recorded by the built-in cam system BCS through the user terminal, and may also transmit the video to a designated external storage server or the CCS server to store it.

Figure 4:
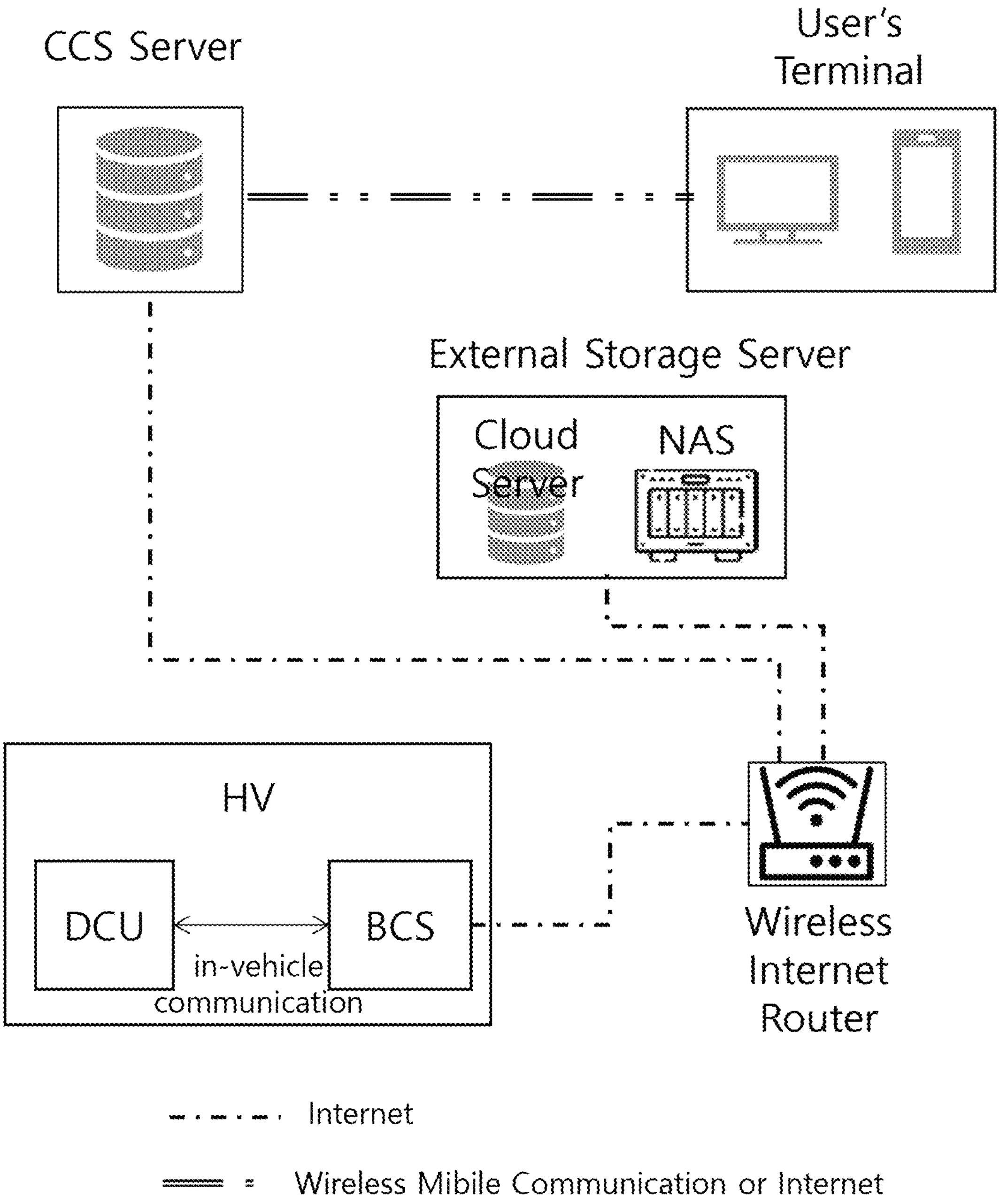
FIG. 4 shows how the devices communicate with each other according to another exemplary embodiment of the present disclosure.
Figure 5:
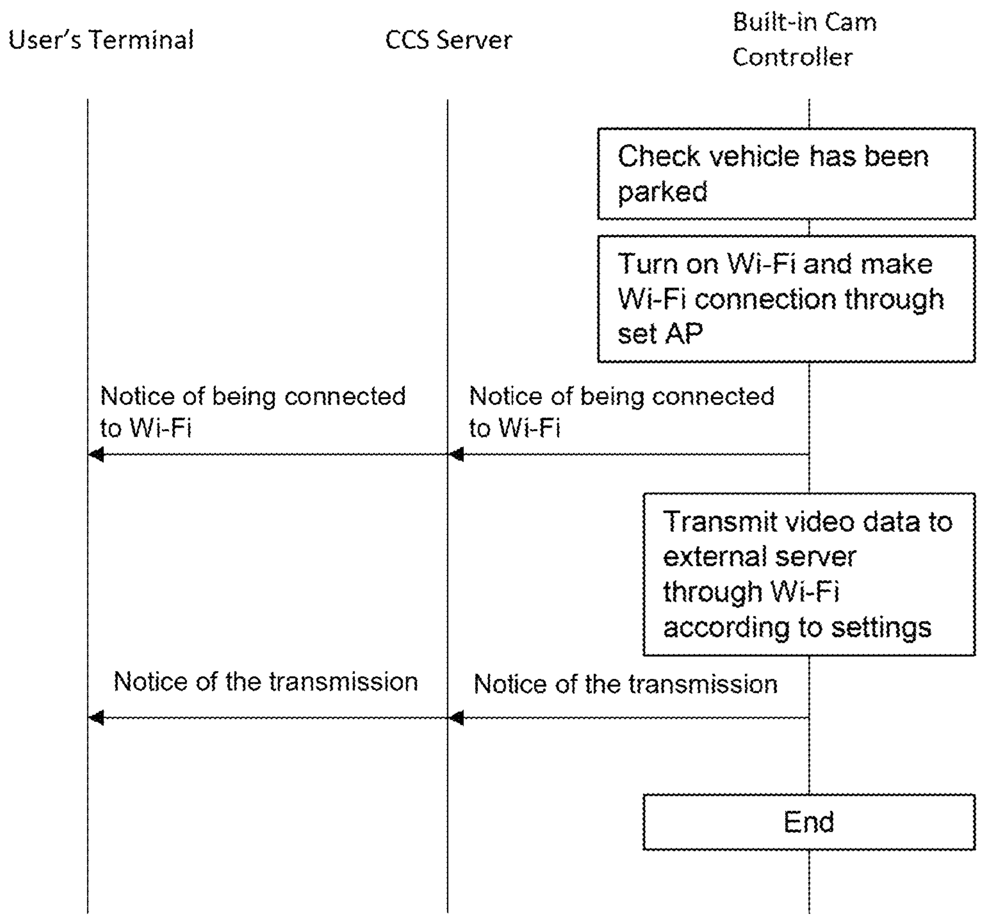
FIG. 5 shows a control process according to the embodiment in FIG. 4.
Figure 6:
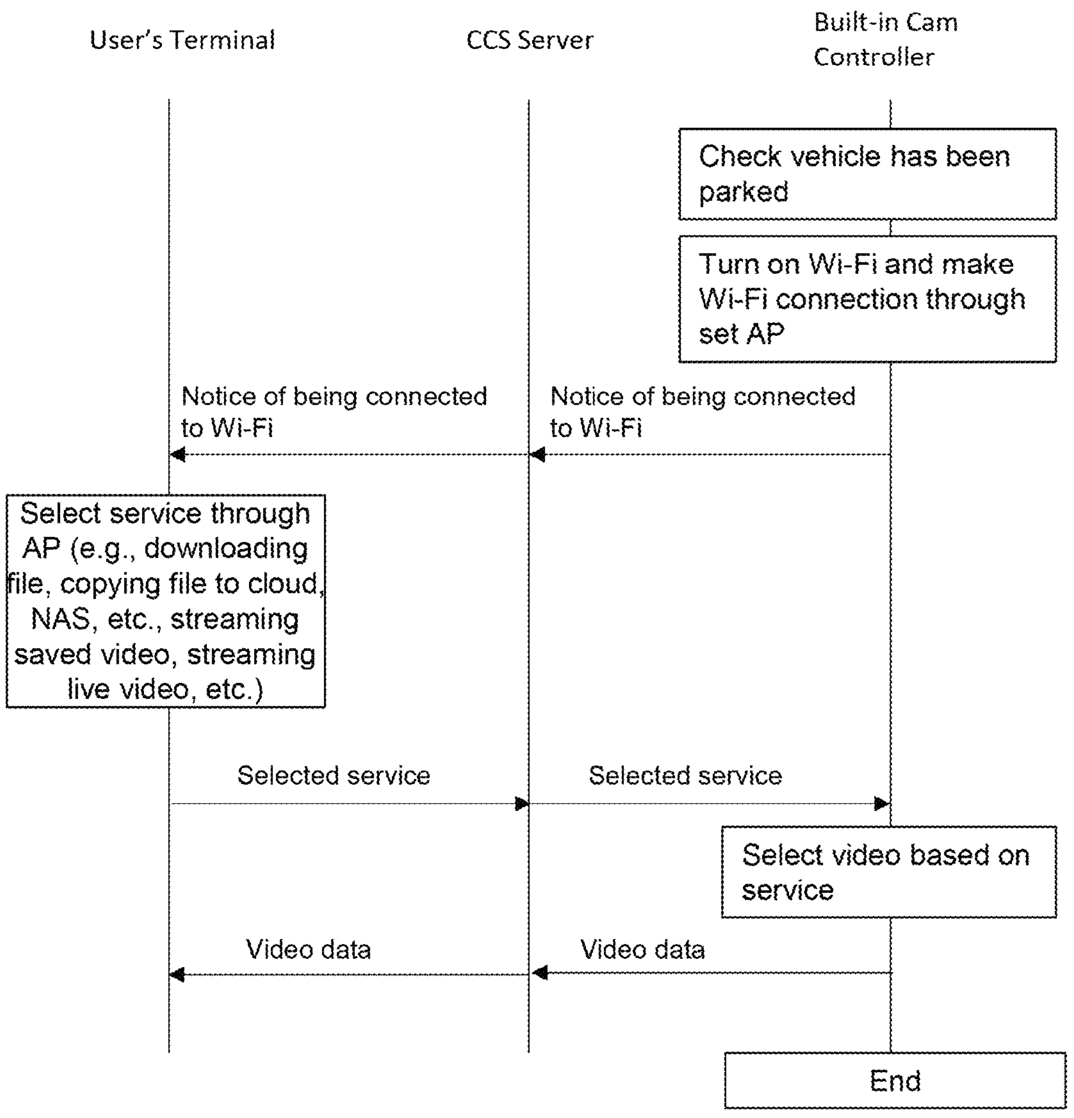
FIG. 6 shows another control process according to the embodiment in FIG. 4.

FIG. 4 shows how the devices communicate with each other according to another embodiment of the present disclosure, and FIGS. 5 and 6 show the control processes according to the embodiment, which will be described in detail below.

First, according to the embodiment of the present disclosure in FIG. 4, as the vehicle HV is turned off and parked, a video obtained by the built-in cam system BCS may be transmitted to the outside through a wireless Internet communication.

Referring to FIG. 5, the built-in cam controller BCC may turn on the Wi-Fi mode of the communication module CM as the vehicle HV is parked.

In addition, the built-in cam controller BCC may search for nearby Wi-Fi routers, collect information thereon, and access a pre-designated Wi-Fi router among them. This pre-designated router may be either open or private. For private routers, it is assumed that the necessary password has already been stored in the communication module (CM).

After the built-in cam controller BCC has been connected to a Wi-Fi router, it may send, to the CCS server, an alarm about being connected to Wi-Fi through Wi-Fi. The CCS server may transmit the received alarm to the user terminal.

The built-in cam controller BCC may transmit a real-time or stored video to an external server, such as the CCS server or an external storage server, through Wi-Fi according to pre-set commands, and may transmit an alarm about the transmission to the user terminal through the CCS server using Wi-Fi.

Meanwhile, as shown in FIG. 6, because the alarm is sent to the user terminal to allow a user to know that the built-in cam controller BCC has been connected to Wi-Fi, it may be possible for the user to use the service described in relation to the embodiment in FIG. 3 in the same way. Specifically, the user may download a real-time or stored video recorded by the built-in cam system BCS through the user terminal. Additionally, the user may transmit the video to a designated external storage server or the CCS server to store it.

According to the embodiment of the present disclosure in FIGS. 5 and 6, the Wi-Fi mode may be switched on as the vehicle HV is parked, but is not necessarily limited thereto. For example, even when the parking impact recording starts after the vehicle HV has been parked, the Wi-Fi mode may be switched on.

In addition, according to the above-described embodiments, the built-in cam system BCS may include the communication module CM, but the communication module CM does not necessarily need to be a dedicated module of the built-in cam system BCS.

Figure 7:
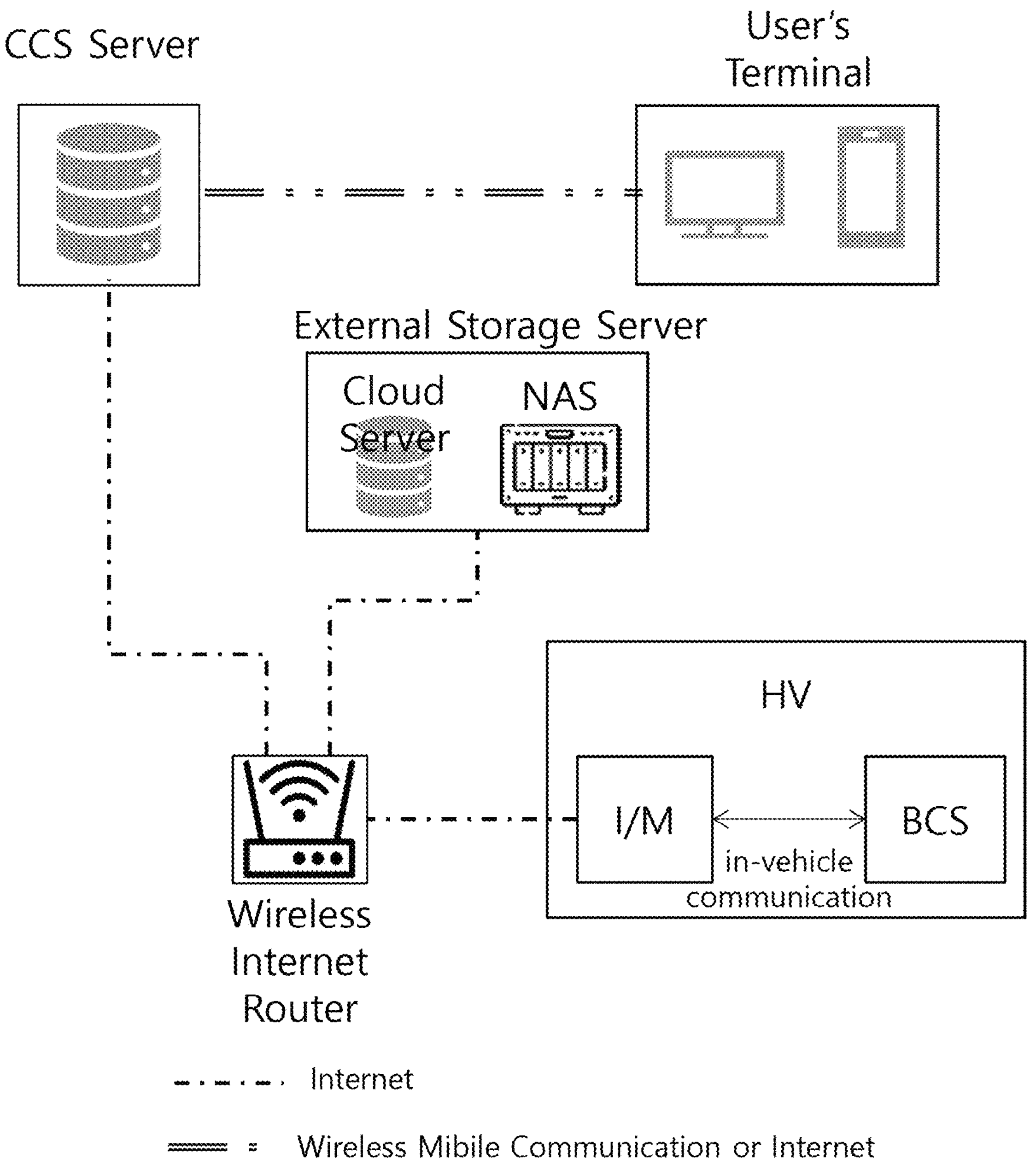
FIG. 7 shows how the devices communicate with each other according to still another exemplary embodiment of the present disclosure.

That is, as shown in FIG. 7, the Internet module I/M may be included as the communication module CM in other devices in the vehicle HV, and the built-in cam controller BCC may perform the above-described control processes by communicating with the Internet module I/M through an in-vehicle communication of the vehicle HV.

According to the embodiments of the present disclosure, videos may be transmitted externally through a low-power wireless Internet communication rather than through the data communication unit DCU of the vehicle HV. This approach reduces both communication costs and power consumption.

In addition, as mentioned above, the reduction in costs and power consumption not only optimizes resources but also enables the transmission of high-definition videos.

The foregoing descriptions of the specific exemplary embodiments of the present disclosure have been presented for the purposes of illustration and description. They are not intended to be exhaustive or to limit the present disclosure to the precise forms disclosed, and obviously many modifications and variations are possible in light of the above-described teachings. The exemplary embodiments were chosen and described to explain certain principles of the present disclosure and their practical application, to enable others skilled in the art to make and utilize the various exemplary embodiments of the present disclosure, as well as various alternatives and modifications thereof. It is intended that the scope of the present disclosure be defined by the claims appended hereto and their equivalents.

What is claimed is:

1. A method of controlling a system for recording videos of a vehicle, wherein the system comprises a camera module configured to capture a video of an area surrounding the vehicle, a first memory configured to store the video transmitted from the camera module, and a first controller which comprises a second memory configured to store a computer program for controlling an operation of storing the video and a processor configured to execute the computer program, the method comprising:

through execution of the computer program by the processor, receiving, through a vehicle modem, a wake-up command from a user terminal through an external server while the vehicle is in a parking mode and turning on a communication module based on the wake-up command;

accessing a router that supports a wireless communication through a communication module, wherein the accessing the router comprises:

searching for one or more wireless Internet routers around the vehicle as the vehicle is parked, transmitting information related to the one or more wireless Internet routers to the external server;

transmitting the information to the user terminal through the external server:

receiving, from the user terminal through the external server, selection information including a password accessing one wireless Internet router;

accessing a pre-designated router among the one or more wireless Internet routers based on the password received from the user terminal; and transmitting a notice of having accessed the pre-designated router to a user terminal through an external server; and transmitting the video to a device external to the vehicle through the wireless communication, wherein the transmitting the video to the device external to the vehicle comprises:

transmitting the video according to a command transmitted from a user terminal through an external server, or automatically transmitting the video according to preset settings.

2. The method of claim 1, wherein the communication module is a communication module in the system for recording videos or a communication module of another device in the vehicle.

3. The method of claim 1, wherein the accessing the router comprises:

turning on the communication module based on a signal transmitted through a communication unit that supports a wireless communication within the vehicle, transmitting information related to at least one wireless Internet router around the vehicle to an external server, and accessing one router selected through the external server among the information related to the at least one wireless Internet router.

4. The method of claim 3, wherein the accessing the one router selected through the external server comprises:

transmitting the information about the at least one wireless Internet router to a user terminal through the external server, and accessing the one router selected through the external server from the user terminal.

5. The method of claim 4, wherein the accessing the one router selected through the external server further comprises receiving a password for accessing the one router from the user terminal through the external server.

6. The method of claim 1, wherein the transmitting the video to the device external to the vehicle comprises:

receiving at least one command from a user terminal through the wireless communication, and transmitting the video to the device external to the vehicle through the wireless communication according to the at least one command.

7. The method of claim 6, wherein the at least one command comprises transmitting the video to the user terminal through an external server or transmitting the video to an external storage server designated from the user terminal.

8. A system for recording videos, the system comprising:

a camera module configured to capture a video of an area surrounding a vehicle;

a first memory configured to store the video transmitted from the camera module; and a first controller comprising a second memory configured to store a computer program for controlling an operation of storing the video and a processor configured to execute the computer program;

a vehicle modem configured to communicate with an external server;

wherein, through execution of the computer program by the processor, the controller is configured to perform:

accessing a router that supports a wireless communication through a communication module, wherein the accessing the router comprises:

searching for one or more wireless Internet routers around the vehicle as the vehicle is parked;

transmitting information related to the one or more wireless Internet routers to the external server;

transmitting the information to a user terminal through the external server; and receiving, from the user terminal through the external server selection information including a password for accessing one wireless Internet router;

accessing a pre-designated router among the one or more wireless Internet routers based on the password received from the user terminal; and transmitting a notice of having accessed the pre-designated router to a user terminal through an external server; and transmitting the video to a device external to the vehicle through the wireless communication, wherein the transmitting the video to the device external to the vehicle comprises:

transmitting the video according to a command transmitted from a user terminal through an external server, or automatically transmitting the video according to preset settings.

9. The system of claim 8, wherein the communication module is a communication module in the system for recording videos or a communication module of another device in the vehicle.

10. The system of claim 8, wherein the accessing the router comprises:

turning on the communication module based on a signal transmitted through a communication unit supporting a wireless communication within the vehicle, transmitting information related to at least one wireless Internet router around the vehicle to an external server, and accessing one router selected through the external server among the information related to the at least one wireless Internet router.

11. The system of claim 10, wherein the accessing the one router selected through the external server comprises:

transmitting the information related to the at least one wireless Internet router to a user terminal through the external server, and accessing the one router selected through the external server from the user terminal.

12. The system of claim 11, wherein the accessing the one router selected through the external server further comprises receiving a password for accessing the one router from the user terminal through the external server.

13. The system of claim 8, wherein the transmitting the video to the device external to the vehicle comprises:

receiving at least one command from a user terminal through the wireless communication, and transmitting the video to the device external to the vehicle through the wireless communication according to the at least one command.

14. The system of claim 13, wherein the at least one command comprises transmitting the video to the user terminal through the external server or transmitting the video to an external storage server designated by the user terminal.

* * * * *